US012303915B2

(12) United States Patent
Gao et al.

(10) Patent No.: US 12,303,915 B2
(45) Date of Patent: May 20, 2025

(54) CARBAMOYL)ACETAMIDE COMPOUND IN FLOTATION OF CALCIUM-BEARING MINERALS

(71) Applicant: CENTRAL SOUTH UNIVERSITY, Changsha (CN)

(72) Inventors: Zhiyong Gao, Changsha (CN); Wanjia Zhang, Changsha (CN); Jian Cao, Changsha (CN); Yuhang Yang, Changsha (CN); Wei Sun, Changsha (CN); Yuehua Hu, Changsha (CN)

(73) Assignee: CENTRAL SOUTH UNIVERSITY, Changsha (CN)

(*) Notice: Subject to any disclaimer, the term of this patent is extended or adjusted under 35 U.S.C. 154(b) by 415 days.

(21) Appl. No.: 17/787,970

(22) PCT Filed: Jun. 22, 2020

(86) PCT No.: PCT/CN2020/097494
§ 371 (c)(1),
(2) Date: Jun. 22, 2022

(87) PCT Pub. No.: WO2021/128771
PCT Pub. Date: Jul. 1, 2021

(65) Prior Publication Data

US 2023/0062243 A1 Mar. 2, 2023

(30) Foreign Application Priority Data

Dec. 23, 2019 (CN) ......................... 201911338504.3

(51) Int. Cl.
*B03D 1/01* (2006.01)

(52) U.S. Cl.
CPC ............ *B03D 1/01* (2013.01); *B03D 2201/02* (2013.01); *B03D 2203/04* (2013.01)

(58) Field of Classification Search
CPC ........................................................ B03D 1/01
See application file for complete search history.

(56) References Cited

U.S. PATENT DOCUMENTS 3,951,786 A 4/1976 Petrovich
2017/0252753 A1* 9/2017 Smolko-Schvarzmayr ................. B03D 1/01
2018/0327908 A1* 11/2018 Duan ...................... C23C 18/54

FOREIGN PATENT DOCUMENTS

CN 86101495 A 6/1987
CN 107716118 A 2/2018
(Continued)

*Primary Examiner* — Ryan B Huang
*Assistant Examiner* — Adam Adrien Germain
(74) *Attorney, Agent, or Firm* — Bayramoglu Law Offices LLC

(57) ABSTRACT

A collector 2-cyano-N-(substituted carbamoyl)acetamide compound in flotation of calcium-bearing minerals and a highly selective flotation reagent for the calcium-bearing minerals are provided. The highly selective flotation reagent includes the 2-cyano-N-(substituted carbamoyl)acetamide compound and an auxiliary collector. The 2-cyano-N-(substituted carbamoyl)acetamide compound has an excellent effect on flotation separation of the calcium-bearing minerals and a foaming performance. Dosage is further reduced and a flotation performance is improved by compounding the compound with the auxiliary collector. The flotation reagent can preferably separate fluorite from calcite by flotation, efficiently separates the fluorite and the calcite from scheelite under neutral condition (pH is about 7), effectively purifies rough scheelite concentrate and improves grade of scheelite concentrate. Meanwhile, the neutral flotation reduces influence on the environment.

12 Claims, 5 Drawing Sheets

(56) References Cited

FOREIGN PATENT DOCUMENTS

| | | | |
|---|---|---|---|
| CN | 108906331 | A | 11/2018 |
| CN | 109499773 | A | 3/2019 |
| CN | 109530094 | A | 3/2019 |
| CN | 111068924 | A | 4/2020 |
| EP | 1949964 | A1 | 7/2008 |
| WO | 2008089906 | A1 | 7/2008 |

* cited by examiner

ONC-1

ONC-1

CARBAMOYL)ACETAMIDE COMPOUND IN FLOTATION OF CALCIUM-BEARING MINERALS

CROSS REFERENCE TO THE RELATED APPLICATIONS

This application is the national phase entry of International Application No. PCT/CN2020/097494, filed on Jun. 22, 2020, which is based upon and claims priority to Chinese Patent Application No. 201911338504.3, filed on Dec. 23, 2019, the entire contents of which are incorporated herein by reference.

TECHNICAL FIELD

The present disclosure belongs to the field of mineral flotation and particularly relates to a highly selective flotation reagent for calcium-bearing minerals.

BACKGROUND

Fluorite, calcite and scheelite are three common calcium-bearing minerals. The fluorite is widely used in the metallurgical industry as a flux and also a main source of hydrofluoric acid. In addition, the fluorite can also be used in the fields of glass, ceramics, optics, military industry and the like due to unique properties. The scheelite is one of main sources of tungsten. The demand of the scheelite and fluorite is increasing day by day in China.

Flotation is a most efficient and common method of separating calcium-bearing minerals currently. The method for selectively separating minerals is based on differences in physicochemical properties of mineral surfaces. The flotation largely depends on use of flotation reagents, in particular flotation collectors. One of the most significant problems in the flotation of the calcium-bearing minerals currently is frequent association of fluorite, scheelite and calcite. The collectors commonly used for calcium-bearing minerals at present comprise fatty acids and soaps thereof, sulfates, sulfonates and the like. The most commonly used collector is oleic acid. Although the oleic acid has a good collecting performance, the collector almost has no sorting property and cannot separate fluorite, scheelite and calcite. Meanwhile, the oleic acid also has defects of poor water solubility, high requirements on temperature and water quality, low grade of concentrates, large fluctuation of indexes and the like. Since cations of the fluorite, the scheelite and the calcite are $Ca^{2+}$ and have similar solubility, a depressant is usually needed to separate minerals in flotation separation of calcium-bearing minerals. However, the depressant increases consumption of additional manpower and material resources and brings adverse effects to the environment. Therefore, it is of great significance in developing a collector capable of efficiently separate fluorite, scheelite and calcite and having a good foaming performance.

SUMMARY

A purpose of the present disclosure is to provide use of a 2-cyano-N-(substituted carbamoyl)acetamide compound in improving a flotation effect of calcium-bearing minerals.

A second purpose of the present disclosure is to provide a flotation reagent containing a 2-cyano-N-(substituted carbamoyl)acetamide compound.

Separation of calcium-bearing minerals such as scheelite from calcium-bearing gangue minerals, especially flotation separation of calcite from fluorite, is one of worldwide problems. Existing reagents have a poor selectivity to the calcium-bearing minerals and cannot achieve good flotation separation. Therefore, the present disclosure provides the following technical solutions:

Use of a 2-cyano-N-(substituted carbamoyl)acetamide compound as a flotation collector in flotation separation of calcium-bearing minerals; where the 2-cyano-N-(substituted carbamoyl)acetamide compound is at least one compound having a structural formula as Formula 1;

Formula 1

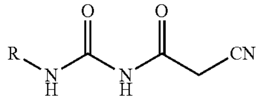

R is a hydrogen group, a $C_1$-$C_{15}$ alkyl group, a $C_3$-$C_{15}$ cycloalkyl group, a propenyl group, an ethynyl group, a phenyl group, a benzyl group or a benzyloxy group; where a substituent group can be attached to an aromatic ring of the phenyl group, the benzyl group and the benzyloxy group.

It is found that the compound with the structure of Formula 1 is a nonionic calcium-bearing mineral collector. The compound has a good foaming performance, collecting performance and selectivity through an intramolecular action between the molecular structure and groups. The compound has a good flotation selectivity and recovery rate of calcium-bearing minerals, can solve a problem urgently needed to be solved in the industry that the calcium-bearing minerals such as scheelite-fluorite-calcite mixed mineral is difficult to be efficiently subjected to flotation separation, and can solve a problem of efficiently removing impurities of rough scheelite concentrate.

The alkyl group is, for example, a linear alkyl group or a branched alkyl group. The cycloalkyl group is preferably a three- to six-membered monocyclic alkyl group, or a six- or more membered bridged ring or a six- or more membered spirocycloalkyl group. A substituent group, such as a $C_1$-$C_3$ alkyl group, an alkoxy group or halogen, can be attached to an aromatic ring of the phenyl group, the benzyl group and the benzyloxy group.

Preferably, the R is a hydrogen atom, a $C_2$-$C_6$ alkyl group, a $C_3$-$C_6$ alkenyl group, a phenyl group, an ethynyl group or a benzyl group.

More preferably, the R is a hydrogen atom, a methyl group, an ethyl group, a propyl group, a butyl group, a pentyl group, a hexyl group, a heptyl group, an octyl group, a propenyl group, an allyl group, a phenyl group, a benzyl group or a benzyloxy group.

Most preferably, the R is a methyl group, an ethyl group, a butyl group, a pentyl group, a hexyl group or a phenyl group. It is found that the compound has a better effect in flotation of calcium-bearing minerals.

Preferably, the calcium-bearing minerals is two or more minerals selected from scheelite and calcium-bearing gangue.

Preferably, the calcium-bearing gangue includes at least one of fluorite and calcite. According to the technical solutions of the present disclosure, the compound of Formula 1 has a good selectivity for two or more mixed minerals of scheelite, fluorite and calcite, can realize selective flotation separation of calcium-bearing mixed minerals and can improve grade of useful minerals in flotation concentrates.

Preferably, the use is for flotation separation of scheelite from calcium-bearing gangue. It is found that the compound of Formula 1 has a better selectivity for scheelite and other calcium-bearing gangue (such as at least one of fluorite and calcite), and can realize reverse flotation of the scheelite and direct flotation of the calcium-bearing gangue, so as to efficiently separate the scheelite and the calcium-bearing gangue.

Preferably, in the use, the calcium-bearing minerals is crushed and slurried to obtain ore slurry, and a flotation reagent containing the 2-cyano-N-(substituted carbamoyl) acetamide compound is added into the ore slurry for flotation.

Preferably, the flotation reagent further includes an auxiliary collector. It is found that existing auxiliary collector and the compound of the 2-cyano-N-(substituted carbamoyl) acetamide compound of the present disclosure are compounded to produce a synergistic effect, thus dosage of the 2-cyano-N-(substituted carbamoyl)acetamide compound can be reduced and a flotation selectivity and recovery rate can be improved.

The auxiliary collector includes at least one of collectors of a hydroximic acid compound, a fatty acid compound, a phosphoric acid compound, a dodecylamine compound and an amino acid compound.

It is found that a proportion of components in the flotation reagent is further controlled to synergistically improve a selectivity of the flotation reagent.

The flotation reagent includes 70-98 parts by weight of the collector 2-cyano-N-(substituted carbamoyl)acetamide compound and less than or equal to 30 parts by weight of the auxiliary collector.

Preferably, the flotation reagent includes 80-98 parts by weight of the collector 2-cyano-N-(substituted carbamoyl) acetamide compound and 2-20 parts by weight of the auxiliary collector. In the preferred range, the flotation reagent containing the collector 2-cyano-N-(substituted carbamoyl)acetamide compound of the present disclosure may have a better synergistic effect and be more conducive to effectively improving a recovery rate and a concentrate grade of the target calcium-bearing minerals.

Preferably, a pH in flotation is 6-10; more preferably, 6-8. When a pH of an ore slurry in the flotation is controlled within 6-8, a performance of the collector can be further exerted and a flotation selectivity and recovery rate can be further improved.

Preferably, the collector 2-cyano-N-(substituted carbamoyl)acetamide compound may have a dosage of more than or equal to $0.8\times10^{-5}$ mol/L, preferably more than or equal to $4\times10^{-4}$ mol/L in the flotation.

The present disclosure further provides a flotation reagent for calcium-bearing minerals. The flotation reagent includes a 2-cyano-N-(substituted carbamoyl)acetamide compound.

Preferably, the flotation reagent further includes an auxiliary collector. It is found that the 2-cyano-N-(substituted carbamoyl)acetamide compound and the auxiliary collector have a good synergy, and can improve a flotation effect of the calcium-bearing minerals, for example, improve a flotation selectivity and a grade of useful components of useful mineral concentrates.

The auxiliary collector is existing collectors in the field of flotation of the calcium-bearing minerals, such as at least one of collectors of a hydroximic acid compound, a fatty acid compound, a phosphoric acid compound, a dodecylamine compound and an amino acid compound.

It is found that a proportion of components in the flotation reagent is further controlled to synergistically improve a selectivity of the flotation reagent. Preferably, the flotation reagent includes 70-98 parts by weight of the collector 2-cyano-N-(substituted carbamoyl)acetamide compound, further preferably 80-98 parts, and less than or equal to 30 parts by weight of the auxiliary collector, further preferably 2-20 parts.

A use method of the flotation reagent of the present disclosure is conventional. In flotation, a pH is preferably controlled to be 6-8.

In the flotation, the flotation reagent has a concentration of greater than or equal to $1\times10^{-5}$ mol/L, preferably greater than or equal to $5\times10^{-4}$ mol/L.

Beneficial Effects:

1. It is found that when a 2-cyano-N-(substituted carbamoyl)acetamide compound is used as a flotation collector for calcium-bearing minerals, the flotation collector has a good flotation selectivity and recovery rate.

2. It is further found that the compound of the 2-cyano-N-(substituted carbamoyl)acetamide compound and the auxiliary collector are compounded to produce a synergistic effect, a collection capacity of the calcium-bearing minerals can be synergistically increased, stability of foams is enhanced, a dosage of the collector2-cyano-N-(substituted carbamoyl)acetamide compound is effectively reduced and a grade and recovery rate of flotation concentrates can be improved.

DETAILED DESCRIPTION

Single minerals of scheelite, fluorite and calcite and mixed calcium-bearing minerals of two or more of the scheelite, the fluorite and the calcite are used as examples to illustrate an effect of the present disclosure.

A 2-cyano-N-(substituted carbamoyl)acetamide compound can be synthesized with reference to existing methods. For example, a synthetic route is as follows:

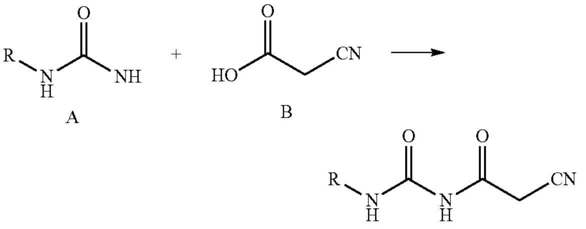

A B (1)

N—R substituted urea (Formula A) and 2-cyanoacetic acid (Formula B) are added to anhydrous acetic acid and react at 70° C. to obtain a target product (Formula 1).

In the following cases, unless otherwise stated, used minerals have a composition as shown in Table 1:

TABLE 1

Original grade and origin of minerals

| Mineral Types | $CaF_2$ (wt %) | $CaCO_3$ (wt %) | $CaWO_4$ (wt %) | Origin |
|---|---|---|---|---|
| Fluorite | 99.8 | — | — | Hunan |
| Calcite | — | 99.7 | — | Hunan |
| Scheelite | — | — | 99.3 | Sichuan |

Example 1

Figure 1:
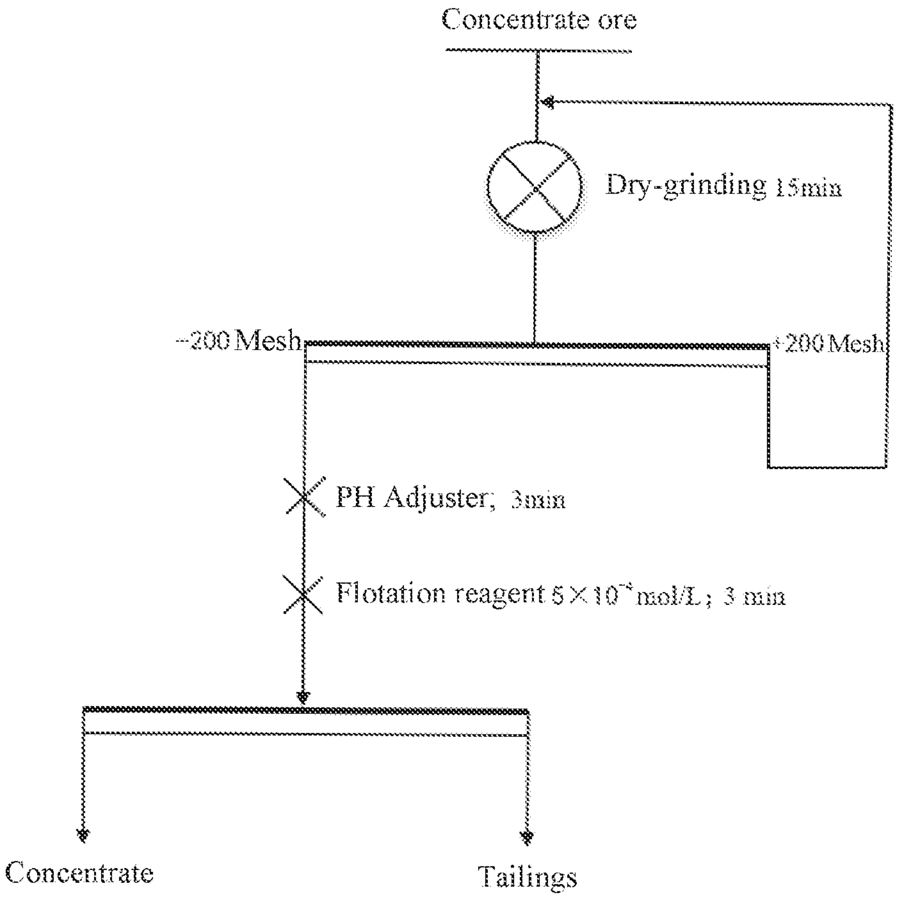
FIG. 1 is a flowchart of flotation in Example 1.

In order to verify a separation effect of single use of a flotation collector in the example on each component in calcium-bearing mixed minerals, scheelite, fluorite and calcite concentrates from Hunan and Sichuan were used. A process shown in FIG. 1 was used. 3 groups were set in the experiment, the flotation collector in the example was used as a flotation reagent for flotation of the different calcium-bearing minerals, the flotation process had the same parameters in each group, the only difference was types of the flotation calcium-bearing minerals, thus flotation and separation effects of the flotation collector in the example were compared.

The flotation collector of the present disclosure: a 2-cyano-N-(substituted carbamoyl)acetamide compound (in Formula 1, R is an ethyl group, namely, in Formula 1, R is a compound of an ethyl group) and terpilenol at a ratio of 0.095 mol:0.005 mol were added to 1 L of deionized water (at a concentration of 0.1 mol/L) and magnetically stirred at 65° C. for 30 min, such that the reagent was fully mixed and sealed for later use.

A specific operation was as follows: an ore concentrate (at a particle size of 3 mm-0.5 mm) was dry-ground for 15 min (the concentrate had a particle size of 0.0740-0.0374 mm after the dry-grinding by using a horizontal ball mill and had a grinding concentration of 35-40%), 2 g of the ground calcium-bearing concentrate (fluorite, calcite or scheelite) was weighed in each group and poured into a 40 mL flotation cell, 30 mL of deionized water was added, the flotation collector of the example was added, an appropriate amount of deionized water was supplemented, stirring was conducted for 3 min, foams were scraped for 3 min, the concentrate was scraped to a concentrate basin with the foams, tailings remained in the flotation cell, the concentrate and the tailings were filtered, dried and weighed separately, the grade of the concentrate was detected and a recovery rate was calculated.

Figure 2:
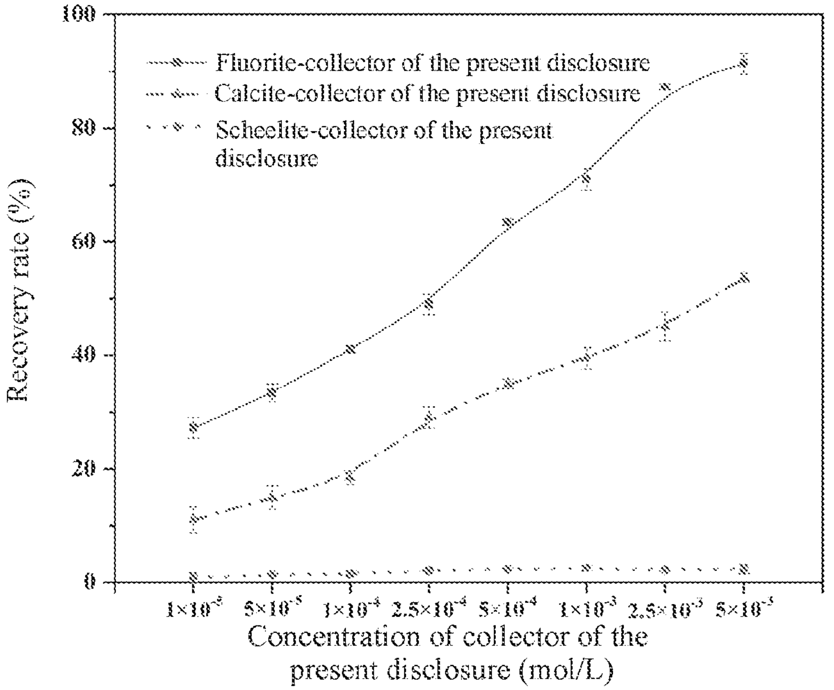
FIG. 2 is a recovery rate diagram of a flotation reagent in Example 1 of the present disclosure.

FIG. 2 shows a recovery rate of scheelite, fluorite and calcite concentrates in Example 1 under different dosages of the reagent. (The flotation collector in the example was the flotation reagent and an ore slurry had a pH of 7).

It can be seen from FIG. 2 that within a dosage range of the reagent to be tested, the flotation reagent in the example had a relatively strong ability to selectively collect the complex calcium-bearing minerals, especially almost did not collect the scheelite, thus can efficiently separate the scheelite from the fluorite and the calcite, and can be used for removing impurities in the scheelite concentrate in industry. The result meant that the flotation collector in the example can efficiently separate the fluorite from the scheelite and separate the fluorite from the calcite to some extent.

TABLE 2

Flotation results of Example 1

| Concentration of flotation reagent of the present disclosure (mol/L) | Recovery rate (%) Fluorite | Calcite | Scheelite |
|---|---|---|---|
| $1 \times 10^{-5}$ | 27.23 | 11.07 | 0.9 |
| $5 \times 10^{-5}$ | 33.38 | 14.97 | 1.28 |
| $1 \times 10^{-4}$ | 41.02 | 18.46 | 1.48 |
| $2.5 \times 10^{-4}$ | 49.01 | 29.07 | 2.1 |
| $5 \times 10^{-4}$ | 63.38 | 34.97 | 2.28 |
| $1 \times 10^{-3}$ | 71.02 | 39.46 | 2.48 |
| $2.5 \times 10^{-3}$ | 87.27 | 45.08 | 2.12 |
| $5 \times 10^{-3}$ | 91.39 | 53.64 | 2.34 |

Example 2

A 2-cyano-N-(substituted carbamoyl)acetamide compound (in Formula 1, R was an ethyl group), benzohydroxamic acid and terpilenol at a ratio of 0.080 mol:0.015 mol:0.005 mol were added to 1 L of deionized water (at a concentration of 0.1 mol/L) and magnetically stirred at 65° C. for 30 min, such that a reagent was fully mixed and sealed for later use.

Scheelite, fluorite and calcite concentrates from Hunan and Sichuan were used. A process shown in FIG. 1 was used. Three groups were set in the experiment, the compound flotation reagent in the example was used, the flotation process had the same parameters in the three groups, the only difference was types of oxide ore single minerals, thus flotation and separation effects of the compound flotation reagent in the example were compared.

An ore concentrate (at a particle size of 3 mm-0.5 mm) was dry-ground for 15 min (the concentrate had a particle size of 0.0740-0.0374 mm after the dry-grinding by using a horizontal ball mill and had a grinding concentration of 35-40%, where the scheelite, the fluorite and the calcite were ground at a pH of 7, 9 and 6 separately), 2 g of the ground concentrate was weighed in each group and poured into a 40 mL flotation cell, 30 mL of deionized water was added, the two flotation reagents at a dosage of $5\times10^{-4}$ mol/L were added, an appropriate amount of deionized water was supplemented, stirring was conducted for 3 min, foams were scraped for 3 min, the concentrate was scraped to a concentrate basin with the foams, tailings remained in the flotation cell, the concentrate and the tailings were filtered, dried and weighed separately, and a recovery rate was calculated.

Figure 3:
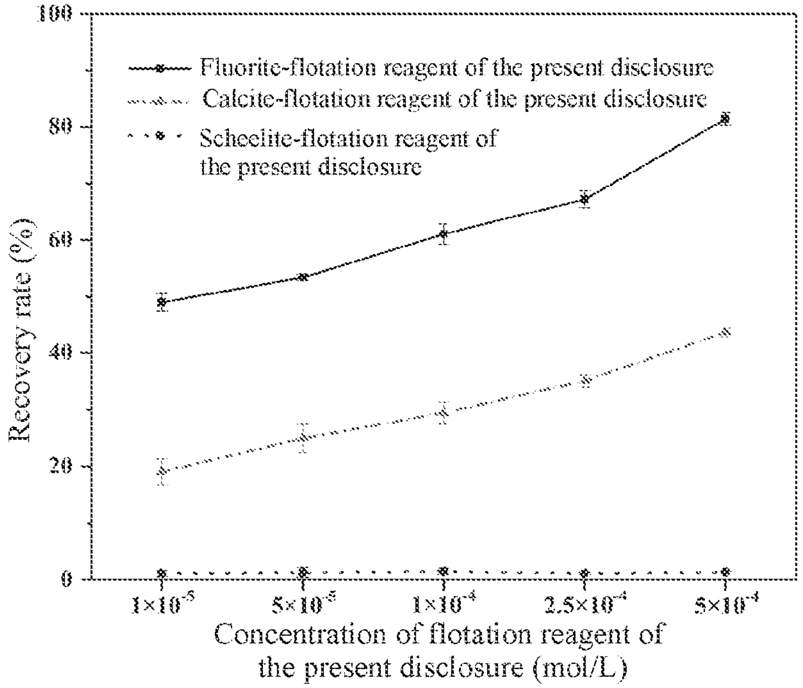
FIG. 3 is a recovery rate diagram of a flotation reagent in Example 2.

FIG. 3 shows a recovery rate of scheelite, fluorite and calcite concentrates in Example 2 under different dosages of the reagent. (The flotation reagent in the example was used and an ore slurry had a pH of 7).

It can be seen from FIG. 3 that within a dosage range of the reagent to be tested, the flotation reagent in the example had a relatively strong ability to selectively collect the complex oxide ores, especially almost did not collect the scheelite, thus can efficiently separate the scheelite from the fluorite and the calcite, and can be used for removing impurities in the scheelite concentrate in industry. When the reagent had a very low dosage ($1\times10^{-5}$ mol/L), the compound flotation reagent in the example had a recovery rate of the fluorite of about 50%, a recovery rate of the calcite of 19.07%, and a recovery rate of the scheelite of only 1.1%, which meant that the compound flotation reagent in the example can efficiently separate the fluorite from the scheelite and separate the fluorite from the calcite to some extent.

As the concentration of the reagent increased from $1\times10^{-5}$ mol/L to $5\times10^{-4}$ mol/L, the compound flotation reagent in the example had a recovery rate of the fluorite increased by 32.38% and when the concentration of the reagent was $5\times10^{-4}$ mol/L, the recovery rate was 81.39%; the compound flotation reagent in the example had a recovery rate of the calcite increased by 24.57% and when the concentration of the reagent was $5\times10^{-4}$ mol/L, the recovery rate was 43.64%; but the recovery rate of the scheelite was kept below 3%. The result meant that as the dosage of the reagent increased, the compound flotation reagent in the example further improved a separation performance of the fluorite, the calcite and the scheelite.

TABLE 3

Flotation results of Example 2

| Concentration of flotation reagent of the present disclosure (mol/L) | Recovery rate (%) Fluorite | Calcite | Scheelite |
|---|---|---|---|
| $1\times10^{-5}$ | 49.01 | 19.07 | 1.1 |
| $5\times10^{-5}$ | 53.38 | 24.97 | 1.28 |
| $1\times10^{-4}$ | 61.02 | 29.46 | 1.48 |
| $2.5\times10^{-4}$ | 67.27 | 35.08 | 1.12 |
| $5\times10^{-4}$ | 81.39 | 43.64 | 1.34 |

Example 3

A pH of an ore slurry is one of the most important parameters to control flotation and may directly affect electrical behaviors of mineral surfaces, cationic hydrolysis, flotation activity of reagents, adsorption properties, and dispersion and coagulation of the ore slurry. A flotation experiment was conducted at different pH values. The optimal pH of the flotation reagent of the present disclosure was investigated for separating fluorite, scheelite and calcite.

A 2-cyano-N-(substituted carbamoyl)acetamide compound (in Formula 1, R is an ethyl group), benzohydroxamic acid and terpilenol at a ratio of 0.085 mol:0.010 mol:0.005 mol were added to 1 L of deionized water (at a concentration of 0.1 mol/L) and magnetically stirred at 65° C. for 30 min, such that the reagent was fully mixed and sealed for later use.

Scheelite, fluorite and calcite concentrates from Hunan and Sichuan were used. A process shown in FIG. 1 was used. Three groups were set in the experiment, the compound flotation reagent in the example was used as the only flotation reagent, the flotation process had the same parameters in the three groups, the only difference was types of oxide ore single minerals, thus flotation and separation effects of the compound flotation reagent in the example were compared.

A specific operation was as follows: an ore concentrate (at a particle size of 3 mm-0.5 mm) was dry-ground for 15 min (the concentrate had a particle size of 0.0740-0.0374 mm after the dry-grinding by using a horizontal ball mill and had a grinding concentration of 35-40%). 2 g of the ground concentrate was weighed in each group and poured into a 40 mL flotation cell, 30 mL of deionized water was added, the flotation reagents at a dosage of $5\times10^{-4}$ mol/L were added, an appropriate amount of deionized water was supplemented, stirring was conducted for 3 min, a pH adjuster (hydrochloric acid or sodium hydroxide) was added to adjust a flotation system to a specific pH, stirring was conducted for 3 min, foams were scraped for 3 min, the concentrate was scraped to a concentrate basin with the foams, tailings remained in the flotation cell, the concentrate and the tailings were filtered, dried and weighed separately, and a recovery rate was calculated.

A pH gradient set in the experiment was 4, 5, 6, 7, 8, 9 and 10. The calcite had a main component of $CaCO_3$, thus the calcite would decompose under an acidic condition. A pH of a solution cannot be stabilized under the acidic condition after the calcite was added, such that the pH gradient of the calcite was 6, 7, 8, 9 and 10.

Figure 4:
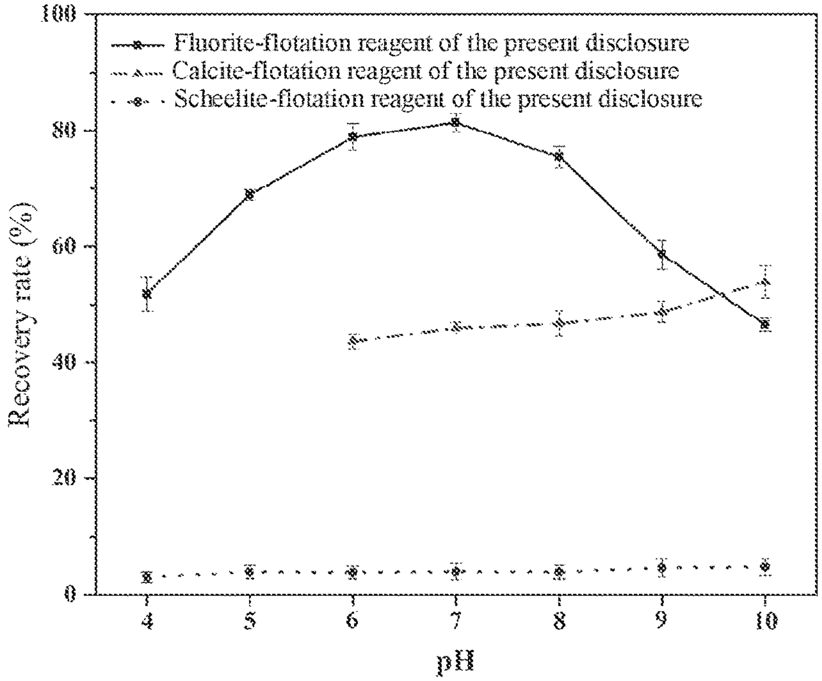
FIG. 4 is a recovery rate diagram of a flotation reagent in Example 3.

FIG. 4 shows a recovery rate of the scheelite, fluorite and calcite concentrates in Example 3 under different pH. (The flotation reagent in the example had a concentration of $5\times10^{-4}$ mol/L, fluorite flotation had an initial pH of 7, calcite flotation had an initial pH of 9, scheelite flotation had an initial pH of 6, the pH was all adjusted to under 7 for a flotation experiment, and pH adjusters were a sodium hydroxide solution and a hydrochloric acid solution).

It can be seen from Example 3 that the flotation reagent of the present disclosure had a stable collection performance on the three oxide ores of the fluorite, the calcite and the scheelite at a pH between 6-8. A recovery rate of the useful mineral fluorite was higher than 75% and meanwhile a recovery rate of the scheelite was lower than 5%. The results indicated that the flotation reagent in the example can effectively and highly selectively collect the complex calcium-bearing minerals in a green neutral acid-base range (with a pH between 6-8).

TABLE 4

Flotation results of Example 3

| pH value of flotation system | Recovery rate (%) Fluorite | Calcite | Scheelite |
|---|---|---|---|
| 4 | 51.85 | — | 2.98 |
| 5 | 68.95 | — | 3.87 |
| 6 | 78.93 | 43.64 | 3.79 |
| 7 | 81.39 | 46.07 | 3.97 |
| 8 | 75.46 | 46.82 | 3.87 |
| 9 | 58.62 | 48.82 | 4.58 |
| 10 | 46.67 | 53.93 | 4.73 |

Example 4

Figure 5:
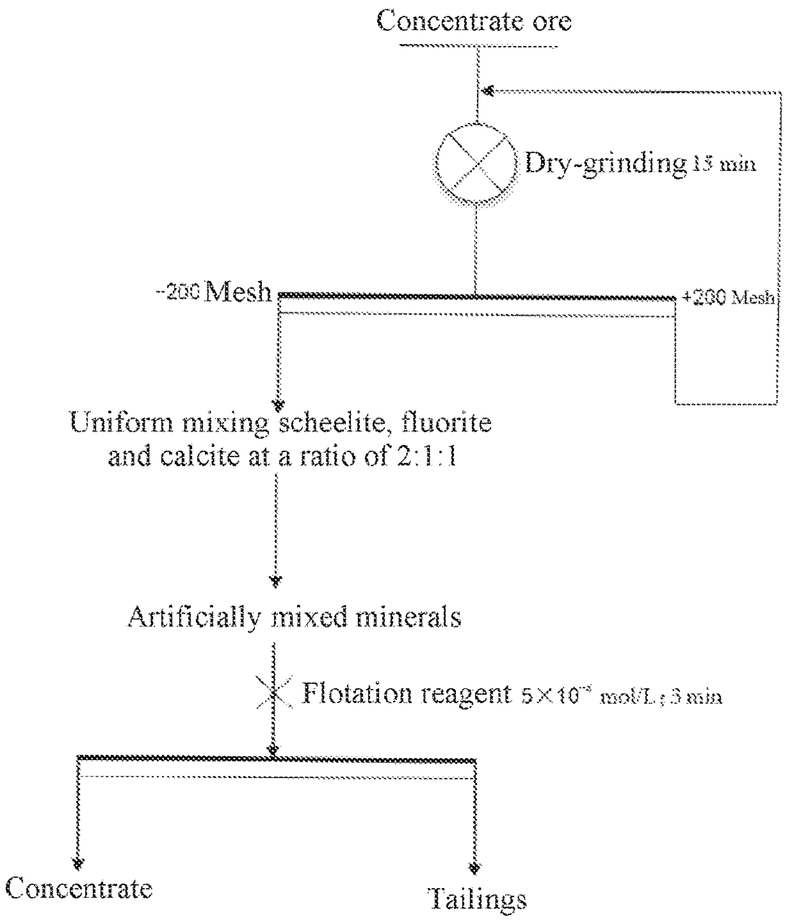
FIG. 5 is a flowchart of flotation in Example 4 and Comparative example 1.
Figure 6:
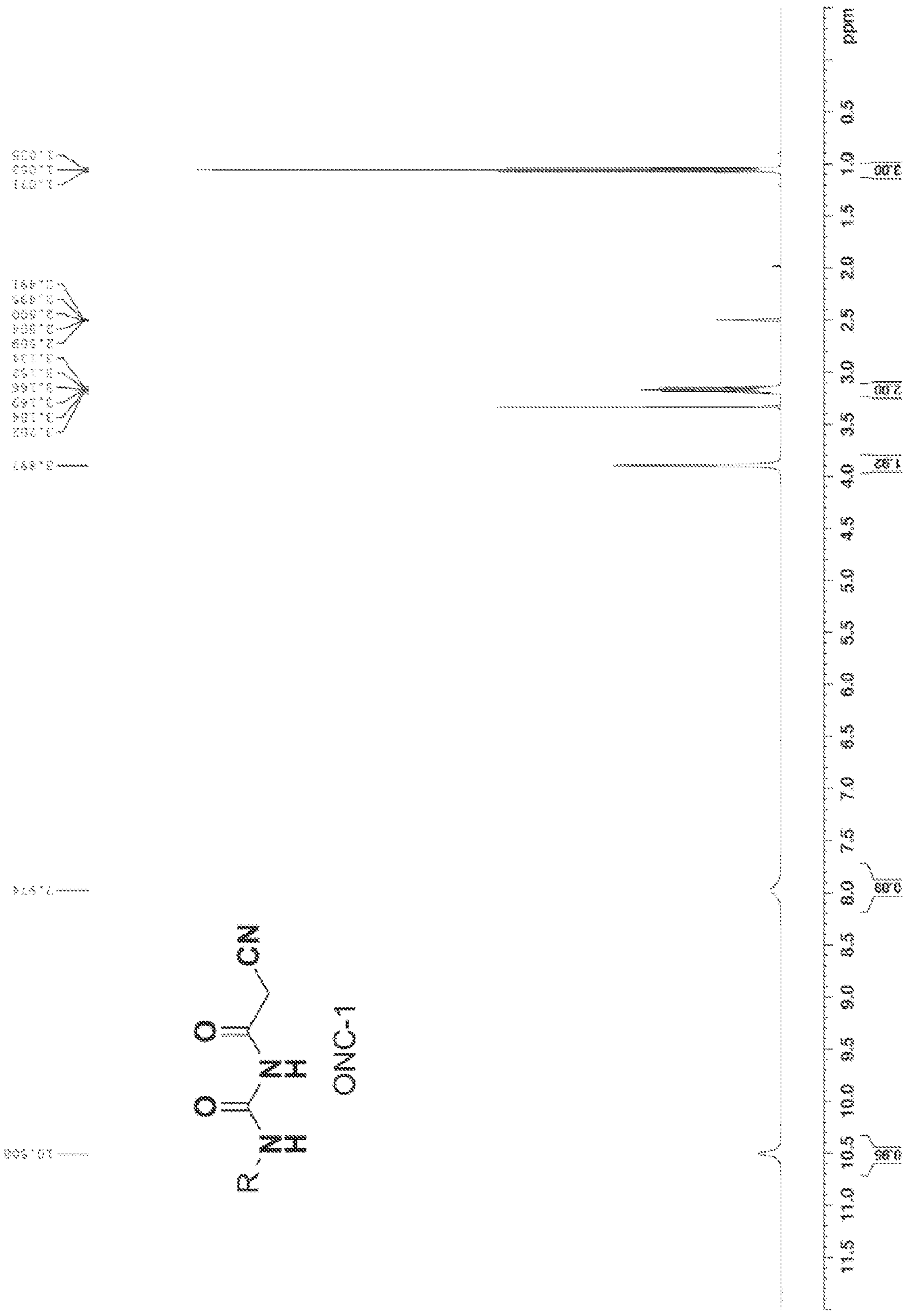
FIG. 6 is a nuclear magnetic resonance (H1-NMR) spectrum of the collector 2-cyano-N-(substituted carbamoyl) acetamide compound (in Formula 1, R is an ethyl group) according to the present disclosure.
Figure 7:
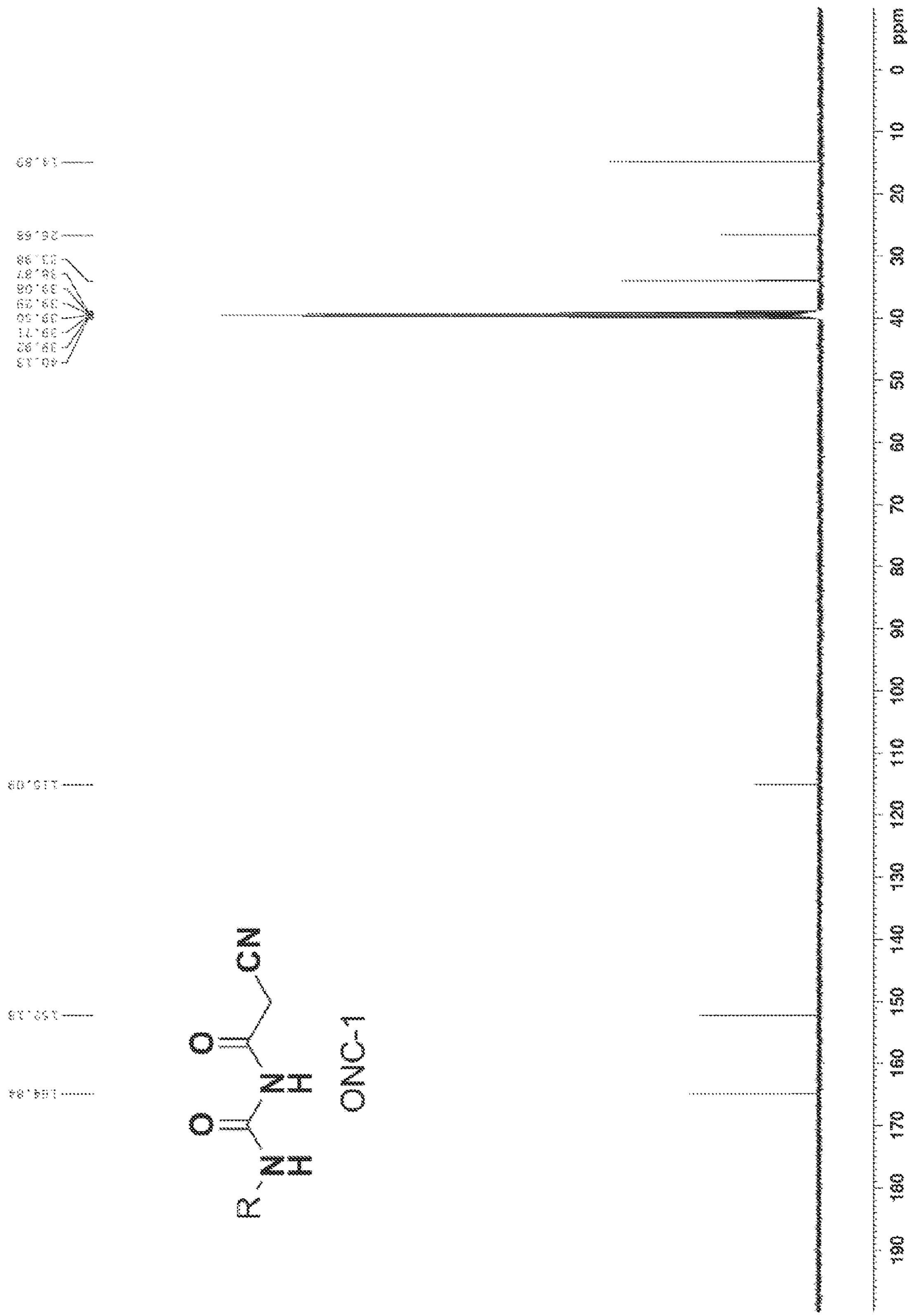
FIG. 7 is a $^{13}$C-NMR spectrum of the collector 2-cyano-N-(substituted carbamoyl)acetamide compound (in Formula 1, R is an ethyl group) according to the present disclosure.

In order to verify a separation effect of a flotation reagent in the example on each component in calcium-bearing mixed minerals, scheelite, fluorite and calcite concentrates from Hunan and Sichuan were mixed uniformly at different proportions to obtain artificially mixed minerals 1#-4# of the three concentrates. A process shown in FIG. 5 was used. 4 groups were set in the experiment, a benzohydroxamic acid compound reagent (in Comparative example 1) was used as a flotation reagent to be compared with the flotation reagent of the present disclosure, the flotation process had the same parameters in each group, the only difference was types of the flotation reagents, thus flotation effects of the benzohydroxamic acid and the flotation reagent in the example were compared.

Flotation reagent of the present disclosure: a 2-cyano-N-(substituted carbamoyl)acetamide compound (in Formula 1, R is an ethyl substituted, benzohydroxamic acid and terpilenol at a ratio of 0.090 mol:0.005 mol:0.005 mol were added to 1 L of deionized water (at a concentration of 0.1 mol/L) and magnetically stirred at 65° C. for 30 min, such that the reagent was fully mixed and sealed for later use.

Benzohydroxamic acid compound reagent (Comparative example 1): benzohydroxamic acid and terpilenol at a ratio of 0.095 mol:0.005 mol were added to 1 L of deionized water (at a concentration of 0.1 mol/L) and magnetically stirred at 65° C. for 30 min, such that the reagent was fully mixed and sealed for later use.

A specific operation was as follows: an ore concentrate (at a particle size of 3 mm-0.5 mm) was dry-ground for 15 min (the concentrate had a particle size of 0.0740-0.0374 mm after the dry-grinding by using a horizontal ball mill and had a grinding concentration of 35-40%), 2 g of the ground and uniformly mixed concentrate according to a proportion was weighed in each group and poured into a 40 mL flotation cell, 30 mL of deionized water was added, the benzohydroxamic acid and the flotation reagent of the example at a concentration of $5\times10^{-4}$ mol/L were added, an appropriate amount of deionized water was supplemented, and an obtained ore slurry had a pH of 7; and stirring was conducted for 3 min, foams were scraped for 3 min, the concentrate was scraped to a concentrate basin with the foams, tailings remained in the flotation cell, the concentrate and the tailings were filtered, dried and weighed separately, the grade of the concentrate was detected and a recovery rate was calculated.

Table 5 shows grades of each component in the artificially mixed minerals 1#-4#in Example 4.

TABLE 5

Composition and proportion of artificially mixed minerals

| Mineral Types | Composition | Proportion | Grade (%) $CaF_2$ | $CaCO_3$ | $CaWO_4$ |
|---|---|---|---|---|---|
| Artificially mixed mineral 1# | Fluorite: Calcite: Scheelite | 1:1:0 | 49.90 | 49.90 | — |
| Artificially mixed mineral 2# | Fluorite: Calcite: Scheelite | 1:0:1 | 49.90 | — | 49.70 |
| Artificially mixed mineral 3# | Fluorite: Calcite: Scheelite | 0:1:1 | — | 49.90 | 49.70 |
| Artificially mixed mineral 4# | Fluorite: Calcite: Scheelite | 1:1:2 | 24.95 | 24.95 | 49.70 |

Table 6 shows a flotation recovery rate and grade of fluorite, calcite and scheelite in Example 4. (In the example, the flotation reagents had a concentration of $5\times10^{-4}$ mol/L and the fluorite, the calcite and the scheelite had an initial pH value adjusted to 7.)

TABLE 6

Flotation results of Example 4
(The flotation reagent of the present disclosure or the benzohydroxamic acid compound reagent had a concentration of $5 \times 10^{-4}$ mol/L and a pH was 7.)

| Mineral Types | Flotation reagent | Grade (%) $CaF_2$ | $CaCO_3$ | $CaWO_4$ | Recovery rate (%) $CaF_2$ | $CaCO_3$ | $CaWO_4$ |
|---|---|---|---|---|---|---|---|
| Artificially mixed mineral 1# | Flotation reagent of the present disclosure | 65.55 | 34.40 | — | 80.24 | 42.13 | — |
| | Benzohydroxamic acid compound reagent | 63.84 | 36.11 | — | 93.21 | 52.72 | — |
| Artificially mixed mineral 2# | Flotation reagent | 95.01 | — | 4.95 | 89.52 | — | 4.67 |
| | Benzohydroxamic acid compound reagent | 54.25 | — | 45.72 | 95.27 | — | 80.28 |
| Artificially mixed mineral 3# | Flotation reagent | — | 91.38 | 8.52 | — | 43.77 | 4.08 |
| | Benzohydroxamic acid compound reagent | — | 39.56 | 60.35 | — | 51.27 | 78.21 |
| Artificially mixed mineral 4# | Flotation reagent | 80.70 | 16.67 | 2.59 | 78.12 | 32.27 | 5.02 |
| | Benzohydroxamic acid compound reagent | 57.86 | 16.87 | 25.19 | 92.17 | 53.76 | 80.21 |

The artificially mixed minerals 1#-4#in the example had a specific mixing ratio as follows:

The artificially mixed mineral 1#: 1 g of fluorite and 1 g of calcite were mechanically stirred at a room temperature for 10 min to fully mix the minerals, and the mixed mineral was sealed for later use.

The artificially mixed mineral 2#: 1 g of fluorite and 1 g of scheelite were mechanically stirred at a room temperature for 10 min to fully mix the minerals, and the mixed mineral was sealed for later use.

The artificially mixed mineral 3#: 1 g of calcite and 1 g of scheelite were mechanically stirred at a room temperature for 10 min to fully mix the minerals, and the mixed mineral was sealed for later use.

The artificially mixed mineral 4#: 0.5 g of fluorite, 0.5 g of calcite and 1 g of scheelite were mechanically stirred at a room temperature for 10 min to fully mix the minerals, and the mixed mineral was sealed for later use.

It can be seen from Table 6 that when the flotation reagent had a concentration of $5\times10^{-4}$ mol/L, the flotation reagent in the example had a significantly stronger ability to collect the fluorite and the calcite in the artificially mixed minerals 1#-4#than the benzohydroxamic acid. Meanwhile, the flotation reagent in the example had a significantly lower ability to collect the scheelite than the benzohydroxamic acid. According to the flotation results, compared with the traditional sulfide flotation reagent benzohydroxamic acid, the flotation reagent in the example had a significantly improved separation effect and a recovery rate of useful minerals was also significantly improved. It can be seen that the flotation reagent in the example was more effective than the traditional oxide ore flotation reagent benzohydroxamic acid and had a better separation effect.

Example 5

In order to verify a separation effect of a flotation reagent in the example on each component in calcium-bearing mixed minerals, scheelite, fluorite and calcite concentrates from Hunan and Sichuan were mixed uniformly at different proportions to obtain artificially mixed minerals 1#-4#of the three concentrates. A process shown in FIG. 5 was used. 4 groups were set in the experiment, corresponding compound flotation reagents of the collectors of the present disclosure with different R groups were used as flotation reagents and compared, the flotation process had the same parameters in each group, the only difference was types of the flotation reagents, thus flotation effects of the flotation reagents in the example were compared.

Flotation reagent 1#: a 2-cyano-N-(substituted carbamoyl) acetamide compound (in Formula 1, R is a pentyl group), benzohydroxamic acid and terpilenol at a ratio of 0.090 mol:0.005 mol:0.005 mol were added to 1 L of deionized water (at a concentration of 0.1 mol/L) and magnetically stirred at 65° C. for 30 min, such that the reagent was fully mixed and sealed for later use.

Flotation reagent 2#: a 2-cyano-N-(substituted carbamoyl) acetamide compound (in Formula 1, R is a phenyl group), benzohydroxamic acid and terpilenol at a ratio of 0.090 mol:0.005 mol:0.005 mol were added to 1 L of deionized water (at a concentration of 0.1 mol/L) and magnetically stirred at 65° C. for 30 min, such that the reagent was fully mixed and sealed for later use.

A specific operation was as follows: an ore concentrate (at a particle size of 3 mm-0.5 mm) was dry-ground for 15 min (the concentrate had a particle size of 0.0740-0.0374 mm after the dry-grinding by using a horizontal ball mill and had a grinding concentration of 35-40%), 2 g of the ground and uniformly mixed concentrate according to a proportion was weighed in each group and poured into a 40 mL flotation cell, 30 mL of deionized water was added, the benzohydroxamic acid and the flotation reagent of the example at a concentration of $5\times10^{-4}$ mol/L were added, an appropriate amount of deionized water was supplemented, and an obtained ore slurry had a pH of 7; and stirring was conducted for 3 min, foams were scraped for 3 min, the concentrate was scraped to a concentrate basin with the foams, tailings remained in the flotation cell, the concentrate and the tailings were filtered, dried and weighed separately, the grade of the concentrate was detected and a recovery rate was calculated.

The artificially mixed minerals 1#-4#in the example had a specific mixing ratio as follows:

The artificially mixed mineral 1#: 1 g of fluorite and 1 g of calcite were mechanically stirred at a room temperature for 10 min to fully mix the minerals, and the mixed mineral was sealed for later use.

The artificially mixed mineral 2#: 1 g of fluorite and 1 g of scheelite were mechanically stirred at a room temperature for 10 min to fully mix the minerals, and the mixed mineral was sealed for later use.

The artificially mixed mineral 3#: 1 g of calcite and 1 g of scheelite were mechanically stirred at a room temperature for 10 min to fully mix the minerals, and the mixed mineral was sealed for later use.

The artificially mixed mineral 4#: 0.5 g of fluorite, 0.5 g of calcite and 1 g of scheelite were mechanically stirred at a room temperature for 10 min to fully mix the minerals, and the mixed mineral was sealed for later use.

Table 7 shows grades of each component in artificially mixed minerals 1#-4#in Example 5.

TABLE 7

Composition and proportion of artificially mixed minerals

| Mineral Types | Composition | Proportion | Grade (%) CaF$_2$ | CaCO$_3$ | CaWO$_4$ |
|---|---|---|---|---|---|
| Artificially mixed mineral 1# | Fluorite: Calcite: Scheelite | 1:1:0 | 49.90 | 49.90 | — |
| Artificially mixed mineral 2# | Fluorite: Calcite: Scheelite | 1:0:1 | 49.90 | — | 49.70 |
| Artificially mixed mineral 3# | Fluorite: Calcite: Scheelite | 0:1:1 | — | 49.90 | 49.70 |
| Artificially mixed mineral 4# | Fluorite: Calcite: Scheelite | 1:1:2 | 24.95 | 24.95 | 49.70 |

Table 8 shows a flotation recovery rate and grade of fluorite, calcite and scheelite in Example 5.

TABLE 8

Flotation results of Example 5
(The flotation reagent of the present disclosure had a concentration of $5\times10^{-4}$ mol/L and a pH was 7.)

| | | Grade (%) | | | Recovery rate (%) | | |
|---|---|---|---|---|---|---|---|
| Mineral Types | Flotation reagent | CaF$_2$ | CaCO$_3$ | CaWO$_4$ | CaF$_2$ | CaCO$_3$ | CaWO$_4$ |
| Artificially mixed mineral 1# | Flotation reagent 1# | 65.35 | 34.65 | | 96.81 | 51.32 | — |
| | Flotation reagent 2# | 62.88 | 37.12 | | 98.81 | 58.32 | — |
| Artificially mixed mineral 2# | Flotation reagent 1# | 93.12 | | 6.88 | 97.87 | — | 7.23 |
| | Flotation reagent 2# | 92.39 | | 7.61 | 99.86 | — | 8.22 |
| Artificially mixed mineral 3# | Flotation reagent 1# | | 85.58 | 14.42 | — | 54.23 | 9.14 |
| | Flotation reagent 2# | | 85.10 | 14.90 | — | 62.65 | 10.97 |
| Artificially mixed mineral 4# | Flotation reagent 1# | 59.22 | 35.94 | 4.84 | 98.67 | 59.88 | 8.07 |
| | Flotation reagent 2# | 58.36 | 35.97 | 5.62 | 99.32 | 61.21 | 9.65 |

To sum up, the flotation reagent of Formula 1 of the present disclosure had a good direct flotation collection of fluorite and calcite, had a reverse flotation effect on scheelite, and can selectively separate the scheelite from calcium-bearing gangue. (such as the fluorite and the calcite).

What is claimed is:

1. A method of a flotation separation of calcium-bearing minerals, comprising:

crushing and slurrying the calcium-bearing minerals to be treated to obtain an ore slurry, and adding a flotation collector into the ore slurry for the flotation separation;

wherein the flotation collector comprises a 2-cyano-N-(substituted carbamoyl) acetamide compound, and the 2-cyano-N-(substituted carbamoyl) acetamide compound is at least one compound having a structural formula as Formula 1;

Formula 1

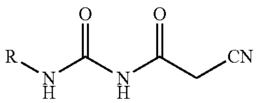

R is a hydrogen group, a $C_1$-$C_{15}$ alkyl group, a $C_3$-$C_{15}$ cycloalkyl group, a propenyl group, an ethynyl group, a phenyl group, a benzyl group, or a benzyloxy group; wherein a substituent group is allowed to be attached to an aromatic ring of the phenyl group, the benzyl group, or the benzyloxy group.

2. The method according to claim 1, wherein the calcium-bearing minerals are two or more minerals selected from scheelite and calcium-bearing gangue.

3. The method according to claim 2, wherein the flotation separation is to separate the scheelite from the calcium-bearing gangue.

4. The method according to claim 1, wherein the flotation collector further comprises an auxiliary collector; and the auxiliary collector comprises at least one collector of a hydroximic acid compound, a fatty acid compound, a phosphoric acid compound, a dodecylamine compound, and an amino acid compound.

5. The method according to claim 1, wherein the flotation collector comprises 70-98 parts by weight of the 2-cyano-N-(substituted carbamoyl) acetamide compound and less than or equal to 30 parts by weight of an auxiliary collector.

6. The method according to claim 1, wherein the ore slurry has a pH of 6-10 in the flotation separation; and the 2-cyano-N-(substituted carbamoyl) acetamide compound has a dosage of more than or equal to $0.8\times10^{-5}$ mol/L in the flotation separation.

7. The method according to claim 2, wherein the calcium-bearing gangue comprises at least one of fluorite and calcite.

8. The method according to claim 1, wherein the ore slurry has a pH of 6-10 in the flotation separation; and the 2-cyano-N-(substituted carbamoyl) acetamide compound has a dosage of more than or equal to $0.8\times10^{-5}$ mol/L in the flotation separation.

9. The method according to claim 2, wherein the ore slurry has a pH of 6-10 in the flotation separation; and the 2-cyano-N-(substituted carbamoyl) acetamide compound has a dosage of more than or equal to $0.8\times10^{-5}$ mol/L in the flotation separation.

10. The method according to claim 3, wherein the ore slurry has a pH of 6-10 in the flotation separation; and the 2-cyano-N-(substituted carbamoyl) acetamide compound has a dosage of more than or equal to $0.8\times10^{-5}$ mol/L in the flotation separation.

11. The method according to claim 4, wherein the ore slurry has a pH of 6-10 in the flotation separation; and the 2-cyano-N-(substituted carbamoyl) acetamide compound has a dosage of more than or equal to $0.8\times10^{-5}$ mol/L in the flotation separation.

12. The method according to claim 5, wherein the ore slurry has a pH of 6-10 in the flotation separation; and the 2-cyano-N-(substituted carbamoyl) acetamide compound has a dosage of more than or equal to $0.8\times10^{-5}$ mol/L in the flotation separation.

* * * * *